US010642740B2

(12) United States Patent
Saha et al.

(10) Patent No.: US 10,642,740 B2
(45) Date of Patent: May 5, 2020

(54) METHODS FOR PERFORMING A MEMORY RESOURCE RETRY

(71) Applicant: Apple Inc., Cupertino, CA (US)

(72) Inventors: Bikram Saha, Cupertino, CA (US); Harshavardhan Kaushikkar, San Jose, CA (US); Sukalpa Biswas, Fremont, CA (US); Prashant Jain, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/996,776

(22) Filed: Jun. 4, 2018

(65) Prior Publication Data

US 2018/0276128 A1 Sep. 27, 2018

Related U.S. Application Data

(63) Continuation of application No. 15/052,000, filed on Feb. 24, 2016, now Pat. No. 9,990,294.

(51) Int. Cl.
*G06F 12/08* (2016.01)
*G06F 12/0842* (2016.01)

(52) U.S. Cl.
CPC .. *G06F 12/0842* (2013.01); *G06F 2212/1024* (2013.01); *G06F 2212/283* (2013.01)

(58) Field of Classification Search
CPC ....... G06F 2212/1024; G06F 2212/283; G06F 12/0842

USPC ......................................................... 711/119
See application file for complete search history.

(56) References Cited

U.S. PATENT DOCUMENTS

| 6,505,268 | B1 | 1/2003 | Schultz et al. |
| 6,934,820 | B2 | 8/2005 | Chauvel et al. |
| 8,495,332 | B2 | 7/2013 | Wakrat et al. |
| 8,707,315 | B2 | 4/2014 | Koning et al. |
| 8,806,110 | B2 | 8/2014 | Zbiciak et al. |
| 9,927,983 | B2 * | 3/2018 | Benisty .................. G06F 3/061 |
| 2014/0325224 | A1 | 10/2014 | Grube et al. |
| 2016/0380921 | A1 | 12/2016 | Blagodurov |

* cited by examiner

*Primary Examiner* — Hua J Song
(74) *Attorney, Agent, or Firm* — Kowert, Hood, Munyon, Rankin & Goetzel, P.C.

(57) ABSTRACT

In an embodiment, an apparatus includes multiple memory resources, and a resource table that includes entries that correspond to respective memory resources of the multiple memory resources. The apparatus also includes a circuit configured to receive a first memory command. The first memory command is associated with a subset of the multiple memory resources. For each memory resource of the subset, the circuit is also configured to set a respective indicator associated with the first memory command, and to store a first value in a first entry of the resource table in response to a determination that the respective memory resource is unavailable. The circuit is also configured to store a second value in each entry of the resource table that corresponds to a memory resource of the subset in response to a determination that an entry corresponding to a given memory resource of the subset includes the first value.

20 Claims, 10 Drawing Sheets

| Memory Command Queue 501 | | | | | | | | |
|---|---|---|---|---|---|---|---|---|
| Mem Cmd 510 | Priority 511 | Retry 512 | MSQ 513 | WBQ 514 | WMQ 515 | WRQ 516 | RDQ 517 | MCH 518 |
| 510a | 0 | 1 | 1 | 1 | 0 | 1 | 0 | 0 |
| 510b | 1 | 1 | 0 | 0 | 0 | 1 | 0 | 1 |
| 510c | 2 | 1 | 1 | 1 | 0 | 1 | 0 | 0 |
| 510d | 1 | 0 | 0 | 0 | 0 | 0 | 1 | 0 |
| 510e | 3 | 0 | 0 | 0 | 1 | 0 | 0 | 0 |
| 510f | 3 | 1 | 0 | 0 | 0 | 0 | 0 | 1 |
| ⋮ | ⋮ | ⋮ | ⋮ | ⋮ | ⋮ | ⋮ | ⋮ | ⋮ |

METHODS FOR PERFORMING A MEMORY RESOURCE RETRY

The present application is a continuation of U.S. application Ser. No. 15/052,000, filed Feb. 24, 2016 (now U.S. Pat. No. 9,990,294); the disclosures of each of the above-referenced applications are incorporated by reference herein in their entireties.

BACKGROUND

Technical Field

Embodiments described herein are related to the field of integrated circuit implementation, and more particularly to the implementation of memory systems.

Description of the Related Art

In a computing system, multiple memory access requests may be queued for processing as the requests are issued. A memory controller may retrieve memory access requests from the queue to process as the memory resources are available. Some of these memory access requests may be processed upon reception if memory resources required to fulfill the memory access request are currently available. A portion of the memory access requests, however, may utilize a resource of the memory system that is currently busy fulfilling a previous processed requests. Requests utilizing unavailable resources may be identified and the memory controller may monitor the unavailable resource(s), and fulfill the corresponding request once the resource(s) is available. This process of identifying a memory request and monitoring the unavailable resource is commonly referred to as a "resource retry."

If multiple requests require unavailable resources, then a number of memory requests added to a resource retry queue may grow. As a result, a response time for completing the memory requests may cause noticeable delays or performance lags in the computing system. In addition, a high priority memory request may become stalled behind lower priority memory requests, potentially leading to a stall of a high priority process, such as, for example, processing of an exception, a trap, or an interrupt.

SUMMARY OF THE EMBODIMENTS

Various embodiments of a system and/or apparatus including a processor are disclosed. Broadly speaking, a system, an apparatus, and a method are contemplated in which the apparatus includes a plurality of memory resources, and a memory including a global resource table. The global resource table may include a plurality of entries, wherein each entry corresponds to a respective memory resource of the plurality of memory resources. The apparatus further includes a control circuit configured to receive a first memory command. The first memory command may be associated with a subset of the plurality of memory resources. For each memory resource of the subset of the plurality of memory resources, the control circuit may be configured to set a respective local indicator associated with the first memory command. The control circuit may also be configured to store a first value in a first entry of the global resource table in response to a determination that the respective memory resource corresponding to the first entry is unavailable, and to store a second value in each entry of the global resource table that corresponds to a respective memory resource of the subset of the plurality of memory resources in response to a determination that an entry corresponding to a given memory resource of the subset of the plurality of memory resources includes the first value.

In a further embodiment, at least one entry of each entry of the global resource table that corresponds to a respective memory resource of the subset may include an identification (ID) value identifying a second memory command waiting for an available entry in the respective memory resource. The second memory command may have an equal or higher priority than other memory commands that are waiting for the respective memory resource to be available.

In another embodiment, in order to store the second value in the at least one entry, the control circuit may be further configured to store the second value in the at least one entry in response to a determination that a priority of the first memory command is greater than the priority of the second memory command, and to modify the ID value in the at least one entry to identify the first memory command instead of the second memory command. In an embodiment, in order to store the second value in the at least one entry, the control circuit may be further configured to store the second value in the at least one entry in response to a determination that a priority of the first memory command is the same as the priority of the second memory command and the first memory command is older than the second memory command, and to modify the ID value in the at least one entry to identify the first memory command instead of the second memory command.

In a further embodiment, the control circuit may be further configured to process the first memory command in response to a determination that each of the memory resources of the subset is available, and that a corresponding ID value in each of the respective entries of the global resource table corresponding to each of the subset of the plurality of memory resources identifies the first memory command. In one embodiment, the global resource table may include a respective set of entries corresponding to each of the plurality of memory resources, wherein each entry of each respective set corresponds to one of a plurality of priorities.

In another embodiment, each of the plurality of memory resources may include a respective resource queue. For each of the subset of the plurality of memory resources, the control circuit may be further configured to set the respective local indicator in response to a determination that the first memory command is waiting for at least one of the subset of the plurality of memory resources to have an available entry in the respective resource queue.

BRIEF DESCRIPTION OF THE DRAWINGS

The following detailed description makes reference to the accompanying drawings, which are now briefly described.

Figure 1:
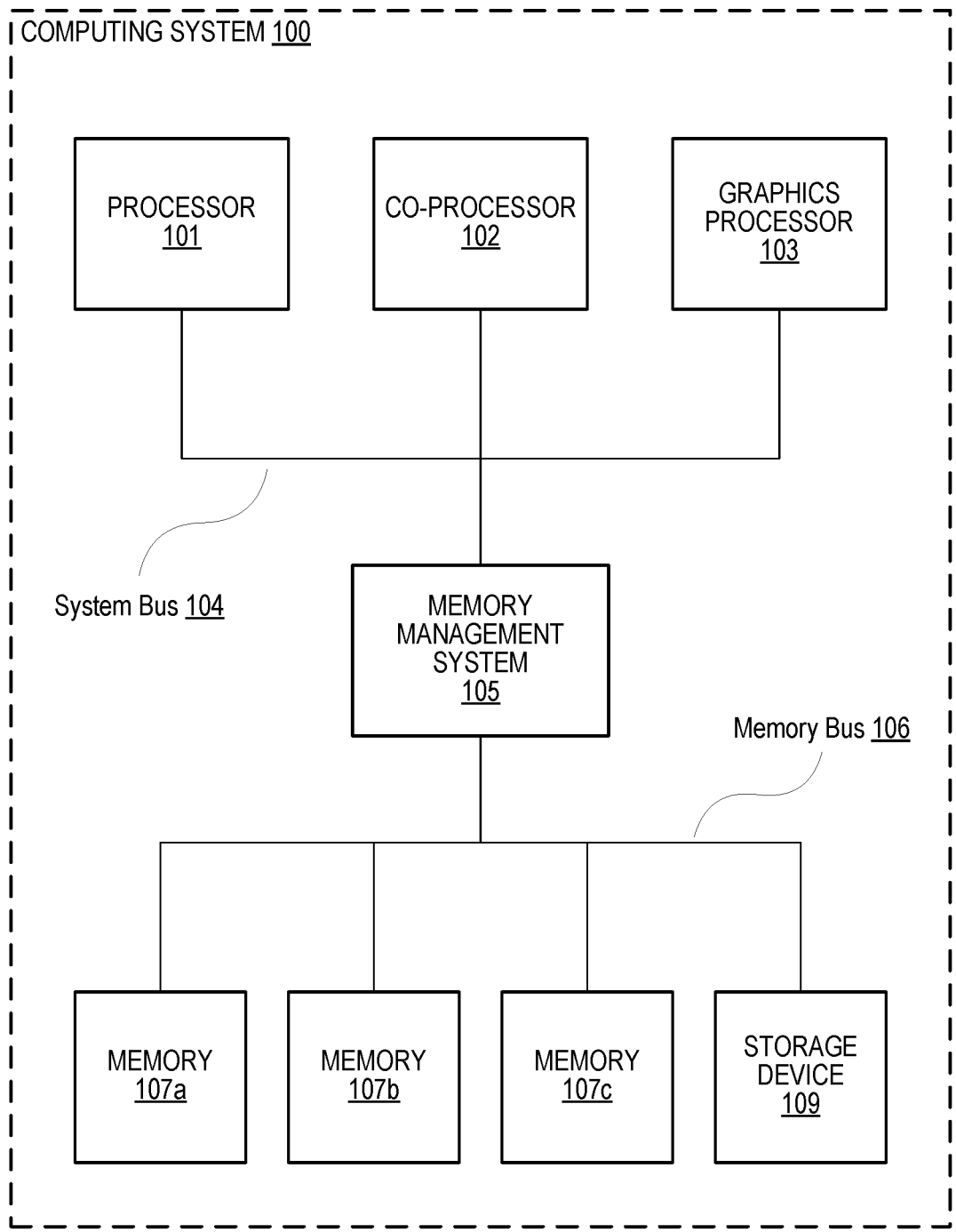
FIG. 1 illustrates a block diagram of an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Some computing systems allow for queuing of memory commands that are waiting for particular resources to become available, such that a given memory command may be processed as resources become available. Memory commands utilizing unavailable resources may be placed into a resource command tracker. In such systems, the unavailable resources may be checked or polled for availability in an order that the memory command was added to the command tracker. As the queue of memory commands grows, performance of the computing system may be degraded if the number of memory commands grows too large. A memory controller may use a round-robin approach to poll the memory commanded resources, one-by-one, until one of the requested resources is determined to be available. A high priority memory command to a busy memory resource might be stalled if it is overrun with lower priority memory commands in the command tracker. The high priority memory command may have to wait many cycles between polling of its requested resources, thereby delaying processing.

As used herein, "memory resource" refers to a resource queue or buffer that stores a memory operation related to memory commands. For example, a given memory command to write a value to a particular memory address may result in several memory operations, such as, for example, a first operation to write the value to a first location in a first cache memory, a second operation to write the value to a second location in a second cache memory, and a third operation to write the value to the memory address specified in the memory command. Each of these three operations may be buffered in a respective resource queue and executed at different times when the respective memory is available to process the corresponding write operation.

Embodiments of systems and methods for managing a resource command tracker are disclosed herein. The disclosed embodiments demonstrate methods for adding and prioritizing memory commands to the command tracker.

A block diagram of an embodiment of computing system is illustrated in FIG. 1. Computer system 100 includes processor 101, co-processor 102, and graphics processor 103 coupled to memory management system 105, via system bus 104. Memory management system 105 is further coupled to memories 107a-107c, and storage device 109, via memory bus 106.

In various embodiments, processor 101 may be representative of a general-purpose processor that performs computational operations. For example, processor 101 may be a central processing unit (CPU) such as a microprocessor, a microcontroller, a digital signal processor, an application-specific integrated circuit (ASIC), or a field-programmable gate array (FPGA). Although a single processor, i.e., processor 101, is illustrated, some embodiments of system 100 may include any suitable number of processors. Further, in some embodiments, processor 101 may correspond to a processing core complex including one or more processors or processing cores. In various embodiments, processor 101 may implement any suitable instruction set architecture (ISA), such as, e.g., ARM™, PowerPC®, Blackfin®, or x86 ISAs, or combination thereof. Processor 101 may execute instructions stored in a memory of computing system 100, such as, memories 107a-107c or storage device 109. Some or all of these instructions may be cached in one or more cache memories within computing system 100. In some embodiments, processor 101 may include one or more local cache memories.

Co-processor 102 may include circuitry for offloading some tasks from processor 101. For example, in various embodiments, co-processor 102 may correspond to a floating point unit, a cryptography unit, a security processor, a direct memory access (DMA), or any other suitable co-processing unit. In some embodiments, co-processor 102 may receive commands from processor 101 to perform appropriate tasks, while in other embodiments, co-processor 102 may execute instructions from a memory within computing system 100, such as, for example, memories 107a-107c or storage device 109.

Graphics processor 103 may include circuitry for processing images or video to be sent to a display screen (not shown). In some embodiments, images to be processed by graphics processor 103 may be stored in memories 107a-107c and/or storage device 109. In other embodiments, memories 107a-107c and/or storage device 109 may store instructions for use by graphics processor 103 to generate images.

Memory management system 105 may include circuits for managing memory commands from processor 101, co-processor 102, and graphics processor 103. In the illustrated embodiment, memory management system 105 decodes memory commands, translates addresses, and determines a location for fulfilling the memory commands. Processor 101, co-processor 102, and graphics processor 103 may send memory commands to memory management system 105 via system bus 104. Memory management system 105 may include one or more memory controllers for sending commands to each of memories 107a-107c and storage device 109 via memory bus 106. Received memory commands may include virtual addresses. Memory management system 105 translates virtual addresses into intermediate or physical addresses depending on a determined location of the address. Memory management system may also include a cache sub-system with one or more cache memories to provide faster access to frequently used memory addresses and/or speculative fetching of additional memory locations dependent upon a requested address. In some embodiments, memory management system 105 may also include a command queue for storing memory commands until the memory command can be fulfilled. A further embodiment of a memory management system will be discussed in more detail below.

Memories 107a-107c and storage device 109 are storage devices that collectively form a memory hierarchy that stores data and instructions for computing system 100. More particularly, the storage device 109 may be a high-capacity, non-volatile memory, such as a disk drive or a large flash memory unit with a long access time, while memories 107a-107c may correspond to volatile memory with shorter access times. Memories 107a-107c may be representative of memory devices in the dynamic random access memory (DRAM) family of memory devices or in the static random access memory (SRAM) family of memory devices, or in some embodiments, a combination thereof. Each of memories 107a-107c and storage device 109 may include respective memory controllers, while, in other embodiments, any or all may correspond to unmanaged memory devices controlled from within memory management system 105.

It is also noted that, to improve clarity and to aid in demonstrating the disclosed concepts, the diagram of computer system 100 illustrated in FIG. 1 has been simplified. In other embodiments, different and/or additional circuit blocks and different configurations of the circuit blocks are possible and contemplated.

Figure 2:
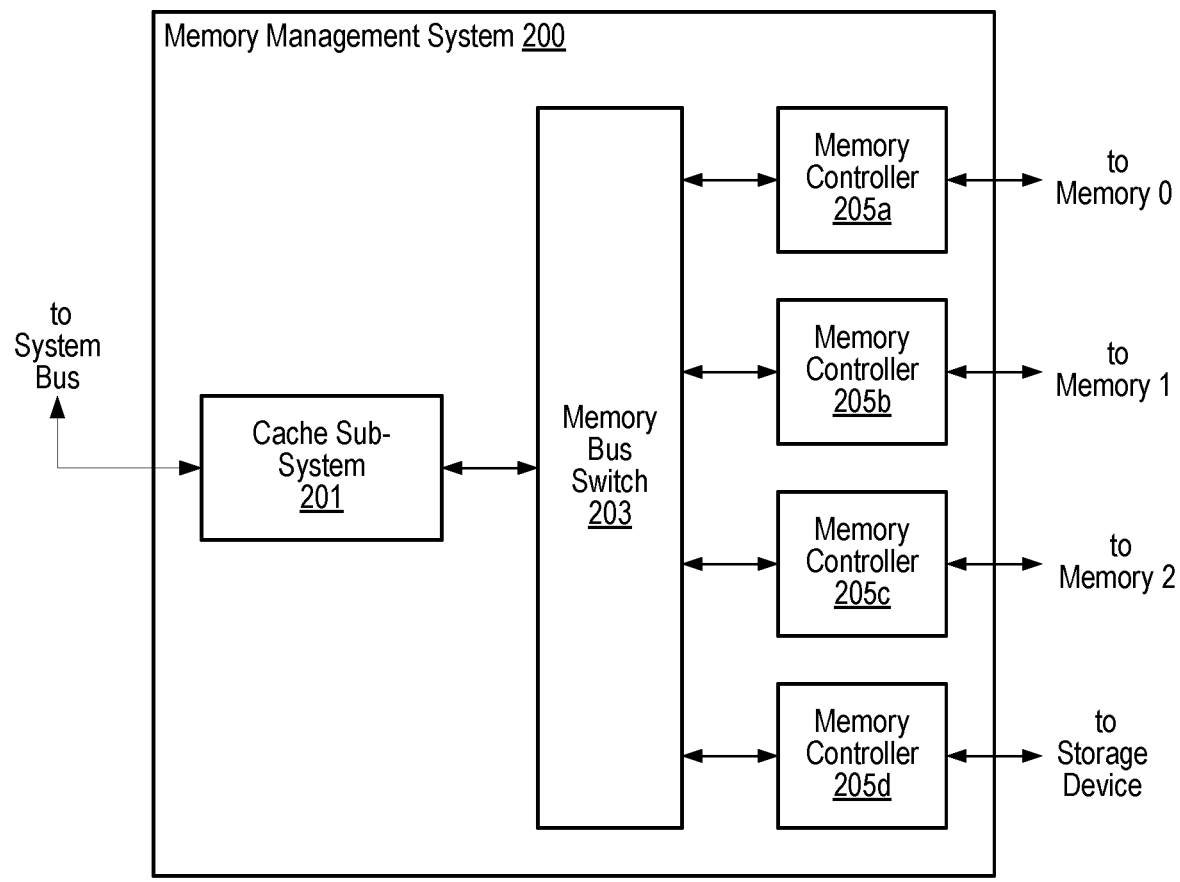
FIG. 2 illustrates a block diagram of an embodiment of a memory management system.

Turning to FIG. 2, a block diagram illustrating an embodiment of a memory management system is shown. In some embodiments, memory management system 200 may correspond to memory management system 105 as illustrated in FIG. 1. Memory management system 200 includes cache sub-system 201 coupled to memory bus switch 203. Memory bus switch 203 is coupled to memory controllers 205a-205d. Each of memory controllers 205a-205c are coupled to a respective one of multiple memories, such as, for example, memories 107a-107c. Memory controller 205d is coupled to a storage device, such as, e.g., storage device 109.

In the illustrated embodiment, cache sub-system 201 is coupled to a system bus from which memory commands are received. Memory commands may be received from any processor in the system, such as, for example, processor 101, co-processor 102, or graphics processor 103 as illustrated in FIG. 1. Some memory commands may be fulfilled by accessing a main system memory, such as, for example, memories 107a-107c, or storage device 109. In some computing systems, the amount of time required to read/write data from/to a main system memory may be longer than an execution time of several processor instructions. To enable faster access to frequently accessed instructions and data, cache sub-system 201 is included in memory management system 200 and may provide faster fulfillment of memory commands by storing values from frequently accessed memory locations in a cache memory that can be read and written faster than the main system memory. After receiving a memory command, cache sub-system 201 determines if the memory command corresponds to a read command or a write command, and if an address included in the memory command corresponds to an address currently stored in cache sub-system 201. If the memory command is a read and the corresponding address is currently stored in cache sub-system 201, then cache sub-system 201 fulfills the memory command by returning a local copy of requested data. Otherwise, if the memory command is a read but a copy of data stored at the requested address is not currently stored in cache sub-system 201, then cache sub-system 201 issues a command to retrieve data at the address included in the memory command, via memory bus switch 203 and one or more of memory controllers 205a-205d. Similarly, if the memory command corresponds to a write command, then cache sub-system 201 may issue a command to write the corresponding data to the one or more memories and/or the storage device, as well as store a local copy of the write data.

Memory commands received by cache sub-system 201 may include a priority indicating an urgency, relative to other memory commands, for fulfilling the corresponding memory command. These priorities may indicate a level of quality of service (QoS) related to the memory commands. For example, a read command issued by processor 101 that fetches an instruction included in an exception process may have a highest QoS level since an exception may need to be executed as quickly as possible. Instruction fetches associated with trap and interrupt processes may also have a highest QoS level, or may be a second highest QoS level to allow exception handling to override the trap or interrupt. A third highest QoS level may be used by memory commands issued by graphics processor 103 when fetching data for a display buffer. A default or normal QoS level may be used for general data and instruction fetches. In the embodiments disclosed herein, four QoS levels are used, although it is noted that in other embodiments, any suitable number of QoS levels may be employed.

In some embodiments, if a memory command does not include a QoS level Cache sub-system 201 may add a QoS level, or may modify an included QoS level depending upon the status of the memory location related to the memory command. For example, if a write command is received for a memory location that is currently stored in cache sub-system 201 and is also shared with another cache (not shown), then cache sub-system 201 may use a higher QoS level for writing the new data to a corresponding memory location such that the other cache may have access to the new data sooner.

Memory bus switch 203 couples cache sub-system 201 to each of memory controllers 205a-205d. In some embodiments, memory bus switch 203 may include circuitry and a translation table for mapping respective logical address ranges to each of memory controllers 205a-205d. Memory bus switch may, therefore, translate logical addresses received as part of memory commands, into physical or intermediate addresses for use with the appropriate memory controller 205a-205d. Memory bus switch 203 may also support accessing two or more memory controllers concurrently. For example, to improve memory access times, data may be read and written from/to memories 0-2 in parallel through memory controllers 205a-205c.

In the present embodiment, memory controllers 205a-205d manage data read and write commands to each respective memory. Memory controller 205a is coupled to memory 0, memory controller 205b is coupled to memory 1, memory controller 205c is coupled to memory 2, and memory controller 205d is coupled to the storage device. Memories 0-2 (not shown) may correspond to DRAM or SRAM, and storage device may correspond to non-volatile memory such as flash memory or a hard-disk drive (HDD). Memories 0-2 and/or the storage device may be managed or unmanaged devices. In various embodiments, memories 0-2 and/or the storage device may be incorporated on a same chip or die as memory management system 200. Alternatively, memories 0-2 may be included on a different chip or die than memory management system 200, and may be co-packaged in a same physical chip package or individually packaged chips.

Memory controllers 205a-205d perform tasks associated with reading, writing, and maintaining data in each respective memory. If the respective memory is unmanaged, then the corresponding memory controller 205 performs all tasks from low-level read and write commands to higher level tasks such as, for example, address translation, garbage collection, wear levelling, bad-block management, and the like. If the respective memory is managed, then the respective memory controller 205 may perform some or all of the higher level tasks, but not lower level tasks. When a given memory controller of memory controllers 205a-d is performing some tasks, it may not be able to receive new commands from cache sub-system 201. In such cases, circuitry in cache sub-system 201 may monitor the given memory controller 205 to determine when the given memory controller is available and then retry the memory command.

In some embodiments, memory controllers 205a-205d may be implemented as general purpose processors executing firmware instructions to perform the disclosed functions. In other embodiments, application-specific circuits may be utilized to implement the memory controllers as state machines.

It is noted that the embodiment of memory management system 200 as illustrated in FIG. 2 is merely an example. The illustration of FIG. 2 has been simplified to highlight features relevant to this disclosure. Various embodiments may include different configurations of the circuit blocks, including additional circuit blocks, such as, additional memory controller, for example. Although a single cache sub-system 201 is shown, in other embodiments, multiple cache memories may be included.

Figure 3:
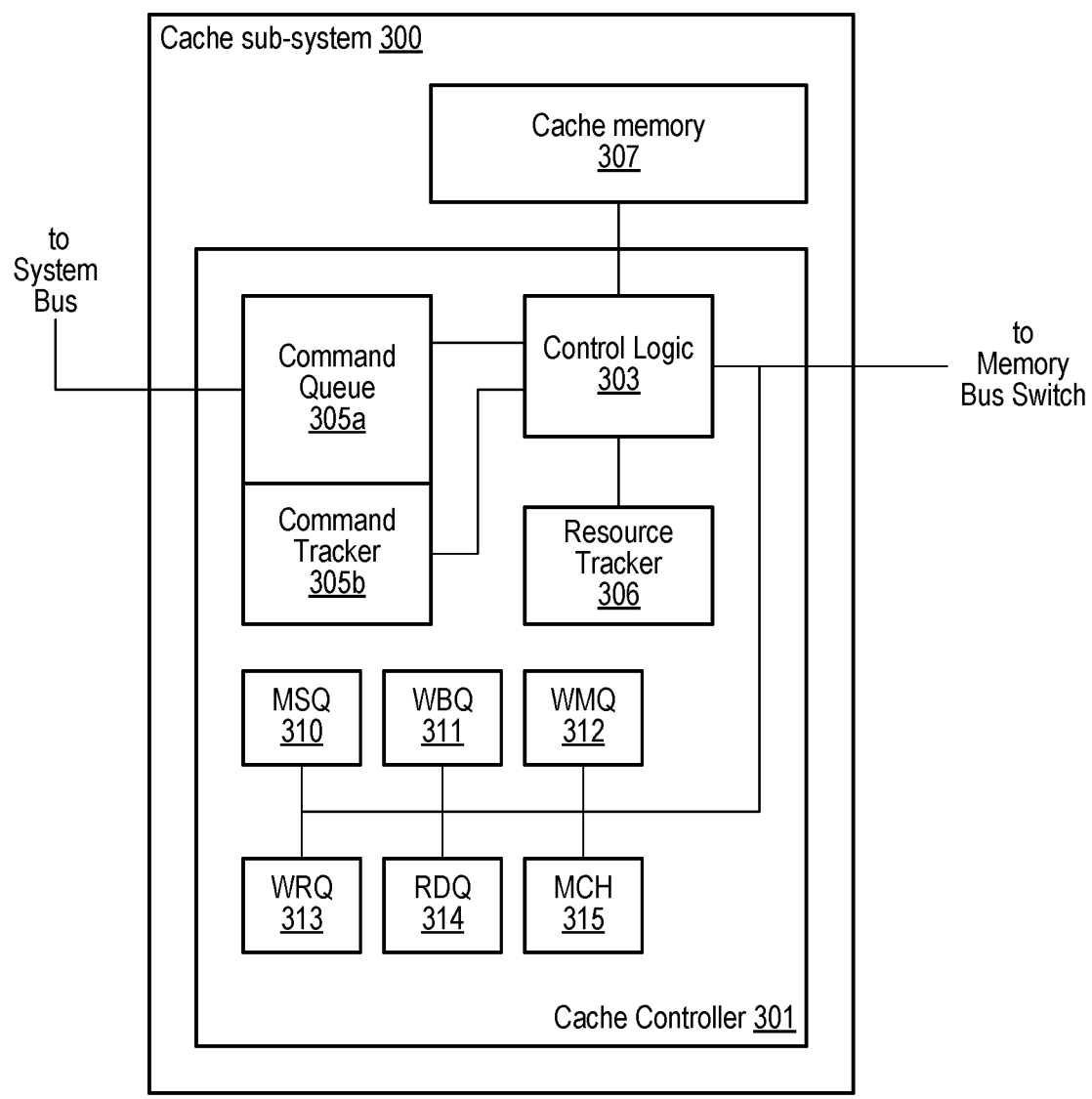
FIG. 3 shows a block diagram of an embodiment of a cache sub-system.

Moving to FIG. 3, a block diagram of a cache sub-system is illustrated. In the illustrated embodiment, cache sub-system 300 corresponds to cache sub-system 201 as depicted in FIG. 2. Cache sub-system 300 includes cache controller 301, which in turn, includes control logic 303, coupled to command queue 305a, command tracker 305b and resource tracker 306. Cache controller 301 further includes a collective group of memory resources 310-315 coupled to control logic 303. In the present embodiment, the memory resources include six resource queues: miss queue (MSQ) 310, write-back queue (WBQ) 311, write direct to memory queue (WMQ) 312, write to cache queue (WRQ) 313, read queue (RDQ) 314, and memory cache hit queue (MCH) 315. Control logic 303 is also coupled to cache memory 307. Referring to the embodiment of computing system 100 in FIG. 1, cache sub-system 300 is a part of memory management system 105 and is used to store instructions and data from any of memories 107a-107c and storage device 109 for use by any of processor 101, co-processor 102, and graphics processor 103.

Memory commands issued by various processors in FIG. 1 (e.g., processor 101, co-processor 102, and graphics processor 103) may be received via a system bus and stored in command queue 305a. Control logic 303 retrieves a memory command from command queue 305a and determines a type of memory command, and a corresponding address, for each memory command stored in command queue 305a. Control logic 303 decodes at least a portion of the address, and determines if data corresponding to the address is currently stored in cache memory 307. In some embodiments, control logic 303 also determines if the corresponding data is valid. As referred to herein, "valid" data refers to cached data whose value corresponds to a value of the data located at the corresponding memory address. For example, cached data may be invalidated if a value of the data in the original memory location is modified without the cached data value being modified accordingly. If the data corresponding to the address is stored in cache memory 307 and is valid, then control logic 303 executes the memory command using values in the corresponding location in cache memory 307. Otherwise, if the cached data is invalid or a write of new data is a part of the command, then control logic 303 processes the memory command using values from the corresponding address in system memory (e.g., memories 107a-107c, or storage device 109).

As part of processing the memory command, control logic 303 determines the path to the system memory location that corresponds to the type of memory command as well as the address in the command. If resources in this determined path are available for executing the command, then the command is executed via a memory bus switch. Otherwise, if at least one resource is not available, control logic 303 places the command in command tracker 305b. Command tracker 305b identifies memory commands that are waiting for one or more resources to become available and additionally indicates on which memory resources 310-315 that the memory commands are waiting. In some embodiments, all memory resources 310-315 that will be used by each memory command are identified. In other embodiments, only the memory resources that are currently busy are indicated. Control logic 303 may continue to process memory commands from command queue 305a and execute the corresponding memory commands if the memory resources in the respective address paths are available.

In the illustrated embodiment, resource tracker 306 includes global resource table with a respective entry for each memory resource 310-315. Each entry of resource tracker 306 includes information identifying at least one memory command waiting to use the corresponding resource and a status of the corresponding memory resource 310-315. Additional details regarding resource tracker 306 will be described below.

Memory resources 310-315 include various queues for use in executing different types of memory commands. MSQ 310 may be used to queue memory commands which result in a cache memory miss (e.g., data associated with an address of a memory command is not stored in cache memory 307). WBQ 311 may be used to queue commands that modify data in cache memory 307 but still need to modify the corresponding data in other memory, such as storage device 109 or memories 107, as shown in FIG. 1. WMQ 312 may be used for write commands that bypass cache memory and write data directly to memories 107 or storage device 109. WRQ 313 may queue commands for writing data into cache memory 307. RDQ 314 may queue read commands from cache memory 307, memories 107, or storage device 109. MCH 315 may be used for commands that generate a cache hit (e.g., data associated with an address of a memory command is stored in cache memory 307). In the present embodiment, memory resources 310-315 each include a respective command queue capable of storing at least one memory command to be processed by the corresponding resource. A given memory resource 310-315 is considered to be unavailable if its respective command queue is full and therefore has no entries available for storing another command.

It is noted that command queue 305a, command tracker 305b, and resource tracker 306 may each be implemented using any suitable type of memory. For example, they may be implemented as data structures in a single RAM array included in cache controller 301 or as part of a RAM including cache memory 307. In other embodiments, command queue 305a, command tracker 305b, and resource tracker 306 may be implemented as respective register memories included in cache controller 301.

It is also noted that cache sub-system 300 in FIG. 3 merely illustrates an example of a cache system. Various other embodiments may include different circuit blocks. FIG. 3 is not intended to illustrate a physical arrangement or relative sizes of the illustrated circuit blocks.

Figures 4, 5:
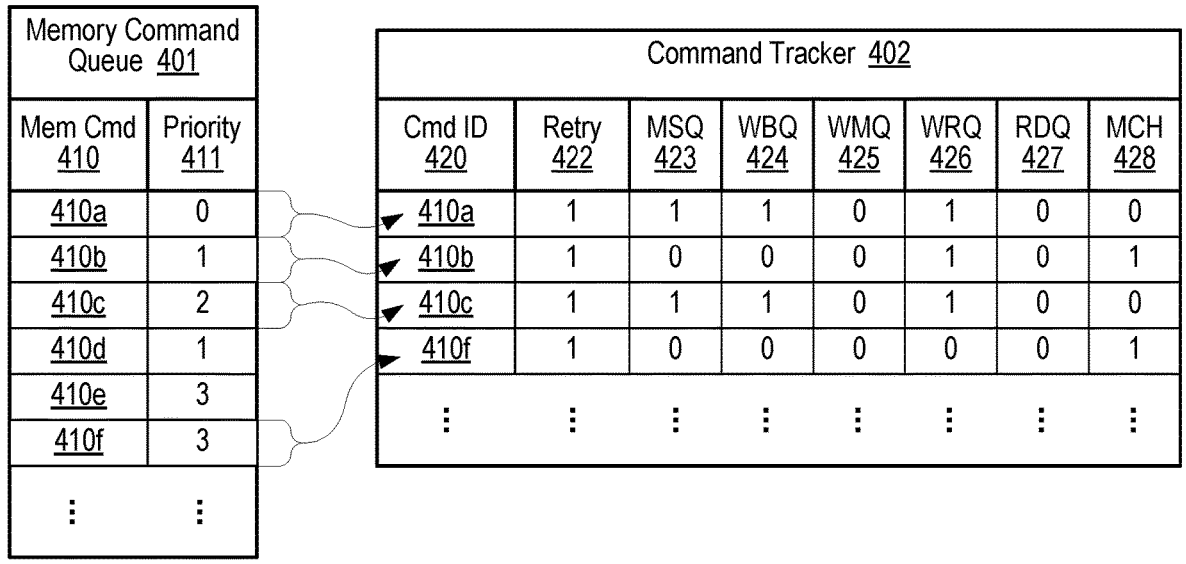
FIG. 4 illustrates a diagram of tables representing an embodiment of memory commands in a command queue and a progression of the memory commands into a command tracker.
FIG. 5 illustrates a diagram of a table representing an embodiment of memory commands in a memory command queue.

Turning now to FIG. 4, a diagram of tables representing an embodiment of a memory command queue and an embodiment of a command tracker table is illustrated. In the present embodiment, memory command queue 401 corresponds to command queue 305a and command tracker 402 corresponds to command tracker 305b in FIG. 3.

In the illustrated embodiment, memory command queue 401 includes two columns: memory command (mem cmd) 410 corresponding to memory commands received via a system bus, and priority 411 corresponding to a priority level assigned to the respective memory commands 410, with a value of 0 representing the highest priority, up to a value of 3 representing the lowest priority. Command queue 401 is shown holding six commands, memory commands 410a-410f, with each memory command 410a-410f including a respective priority. In the current example, memory commands 410a-410f are received in order, from memory command 410a received first, to memory command 410f received last.

In the present embodiment, command tracker 402 includes eight columns for each entry. Command identification (cmd ID) 420 is a value that identifies a given command in memory command queue 401. Retry 422 is a status value to indicate that the corresponding entry is currently waiting for one or more resources to become available. Columns 423 through 428 correspond to the six memory resources 310-315 in cache sub-system 300. MSQ 423, WBQ 424, WMQ 425, WRQ 426, RDQ 427, and MCH 428 each indicate if the corresponding memory command 410 is waiting for the respective memory resource 310-315. For the following example, command tracker 402 starts with no memory commands in the memory command 410 column, and memory resource WRQ 313 is currently unavailable for processing new commands.

Referring to cache sub-system 300 of FIG. 3, control logic 303 retrieves memory command 410a and determines that memory resources MSQ 310, WBQ 311, and WRQ 313 will be needed for this command. Since WRQ 313 is busy, control logic 303 creates a command tracker entry for command 410a by setting values for MSQ 423, WBQ 424, and WRQ 426 to '1' to indicate memory command 410a needs these resources to continue processing. Command ID 420 is set to identify command 410a and the corresponding retry 422 bit is set to indicate that this entry is waiting for the indicated memory resources to become available.

Control logic 303 continues to process commands in memory command queue 401 by retrieving memory command 410b. Memory command 410b needs WRQ 313 and MCH 315. Since WRQ 313 is unavailable, control logic 303 creates another entry in command tracker 402 for command 410b by setting retry 422, WRQ 426, and MCH 428 each to a value of '1' to indicate the resources are needed. Next, control logic 303 retrieves memory command 410c, and determines resources MSQ 310, WBQ 311 and WRQ 313 are needed. Another entry in command tracker 402 is created for command 410c, with values for retry 422, MSQ 423, WBQ 424, and WRQ 426 set to 1.

Control logic 303 now retrieves memory command 410d and determines it only needs memory resource RDQ 314. RDQ 314 is available, so command 410d continues to be processed by control logic 303 and an entry in command tracker 402 is not required. Command 410e is retrieved next, which requires resource WMQ 312. WMQ 312 is also available, so memory command 410e continues processing without a need for an entry in command tracker 402.

Control logic 303 retrieves memory command 410f which needs resource MCH 315. MCH 315 is available, but it has been identified as needed by command 410b which is waiting for WRQ 313 to become available. In some embodiments, control logic 303 may continue to process command 410f since the resource to process command 410f is available. In the illustrated embodiment, however, priority 411 of 410f (priority 3) is compared to the priority 411 of command 410b (priority 1). Since 1 is a higher priority than 3 in this embodiment, command 410f must wait until command 410b has been processed, and an entry in command tracker 402 is created for command 410f, with MCH 428 set to 1.

In some embodiments of command tracker 402, entries may be added, as just described, in the order in which the memory commands are read from memory command queue 401 until command tracker 402 has no empty entries. Command tracker 402 may, in some embodiments, include a number of entries equal to the number of entries in memory command queue 401, resulting in memory command queue 401 filling up before command tracker 402. In other embodiments, a number of entries may be limited dependent upon a priority of the command and/or a type of the memory command. For example, command tracker 402 may include a single entry corresponding to each priority level, such if command tracker 402 supports four priority levels, then it would include four entries. As another example, command tracker 402 may include two entries per priority level, with one of the two entries reserved for write commands and the other entry reserved for read commands.

It is noted that the tables of FIG. 4 are merely examples. Tables 401 and 402 are logical representations of a command queue and command tracker, respectively. The illustrated tables are not intended to represent physical arrangements of data included a command queue or a command tracker. Other embodiments may include any number of columns to include any suitable information related to a given memory command, such as addresses, data, or additional information used to process the given memory command.

Moving now to FIG. 5, a diagram of a table representing an embodiment of memory commands in a queue is presented. In some embodiments, memory command queue 501 may combine features of both command queue 305a and command tracker 305b from FIG. 3 into a single table instead of two (or, in some embodiments, more) tables. Memory command queue 501 includes nine columns: memory command (mem cmd) 510, priority 511, retry 512, MSQ 513, WBQ 514, WMQ 515, WRQ 516, RDQ 517, and MCH 518.

In the present embodiment, columns memory command 510 and priority 511 correspond to the descriptions given above for memory command 410 and priority 411 of memory command queue 401 in FIG. 4. Similarly, retry 512, MSQ 513, WBQ 514, WMQ 515, WRQ 516, RDQ 517, and MCH 518 correspond to the descriptions given above for retry 422, MSQ 423, WBQ 424, WMQ 425, WRQ 426, RDQ 427, and MCH 428 of command tracker 402 in FIG. 4.

Referring collectively to cache sub-system 300 of FIG. 3 and memory command queue 501, the example described in FIG. 4 is repeated with memory command queue 501 replacing memory command queue 401 and command tracker 402. The example begins with memory commands 510 having been received by memory command queue 501 in order, from 510a first through 510f last. In some embodiments, upon receipt, columns retry 512 through MCH 518 may be clear (set to a value of '0'). For the example, memory resource WRQ 313 is unavailable, while the other five memory resources are available.

In the example, control logic 303 retrieves memory command 510a and determines that memory resources MSQ 310, WBQ 311, and WRQ 313 will be needed for this command. Since WRQ 313 is unavailable, control logic 303 sets the respective values of MSQ 513, WBQ 514, and WRQ 516 to '1' to indicate memory command 510a needs these resources to continue processing. The corresponding retry 512 bit is set to indicate that this entry is waiting for the indicated memory resources to become available.

Memory command 510b is fetched next by control logic 303. Memory command 501b needs memory resources WRQ 313 and MCH 315. Since WRQ 313 is unavailable, control logic 303 sets the values of WRQ 516 and MCH 518 that correspond to memory command 510b. In addition, the corresponding retry 512 value is set to indicate that command 510b is waiting for resources to become available. Memory command 510c is fetched next by control logic 303 and corresponding values in memory command queue 501 are set to indicate that command 510c needs resources MSQ 310, WBQ 311, and WRQ 313, and set retry 512 to indicate the command is in a retry state.

Memory command 510d is retrieved next by control logic 303. Memory command 510d does not require use of the unavailable resource WRQ 313, only RDQ 314, so command 510d may continue to be processed. In some embodiments, memory command queue 501 may be updated by setting the corresponding RDQ 517 value to 1. A combination of the resource value (RDQ 517) being set while the corresponding retry 512 value being clear may indicate that RDQ 314 is being used for memory command 510d. In various other embodiments, memory command 510d may be moved from memory command queue 501 and into RDQ 314 upon the determination that the needed resources are all available, or command 510d may remain in memory command queue 501 while being processed, but with the corresponding memory resource values left clear.

Control logic 303 fetches memory command 510e next, and since it only requires resource WMQ 312, which is available, control logic 303 continues to process command 510e as described for command 510d. Memory command 510f is then fetched by control logic 303. Memory command 510f only requires the resource MCH 315, which is available. MCH 315, however, is required by memory command 510b which has a higher priority ('1' versus '3') than command 510f, nut is waiting for resource WRQ 313 to become available. In some embodiments, control logic 303 may continue to process command 510f since all resources needed by command 510f are available. In the illustrated embodiment, however, due to the lower priority, command 510f may be put into the retry state (as indicated by the corresponding retry 512 value in FIG. 5) with the corresponding MCH 518 value set.

When resource WRQ 313 becomes available, memory commands in the retry state, i.e., memory commands 510a, 510b, 510c, and 510f, are processed in order of their priority. Since commands 510c and 510f do not need the same resources, after command 510b is processed and MCH 518 is made available, memory command 510d may be processed regardless of the state of resource WRQ 313 and command 510c, despite the higher priority of command 510c.

It is noted that memory command queue 501 of FIG. 5 is an example for demonstrating the disclosed embodiments. Similar to FIG. 4, memory command queue 501 is a logical representation of a command queue. Although memory command queue 501 shows nine columns, any suitable number of columns may be included in other embodiments, such as, for example, memory commands, addresses, data, or additional information. Although four priorities are shown, any suitable number of priorities may be included.

Figure 6:
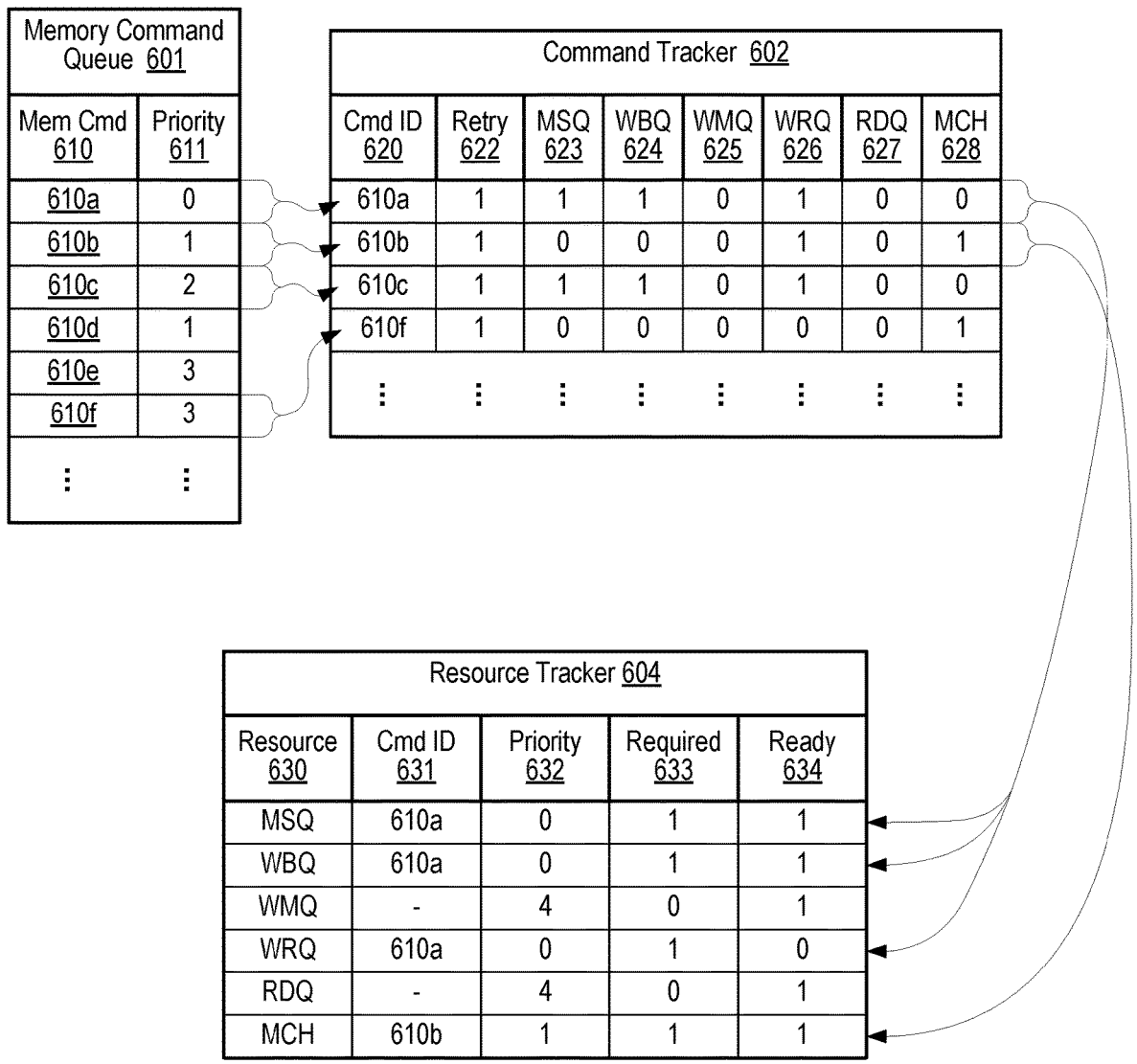
FIG. 6 shows a diagram of tables representing an embodiment of a memory queue, a command tracker, and a global resource table.

Turning to FIG. 6, a diagram of tables representing an embodiment of a memory queue, a command tracker, and a resource tracker is shown. In the illustrated embodiment, referring to FIGS. 3 and 6, memory command queue 601 corresponds to command queue 305a, command tracker 602 corresponds to command tracker 305b, and resource tracker 604 corresponds to resource tracker 306 in FIG. 3, Memory command queue 601 and command tracker 602 also correspond to memory command queue 401 and command tracker 402 in FIG. 4. Table columns in FIG. 6 correspond to the similarly named and numbered columns in FIG. 4. Resource tracker 604 includes columns resource 630, command ID (CMD ID) 631, priority 632, required 633, and ready 634.

For the following example, refer to cache sub-system 300 of FIG. 3 and the tables of FIG. 6. The example begins with memory commands 610 having been received by memory command queue 601 in order, from 610a first through 610f last. For the example, memory resource WRQ 313 is again unavailable, while the other five memory resources are available.

Control logic 303 reads memory command 610a in memory command queue 601. As previously described in regards to FIG. 4, control logic 303 determines which memory resources are needed for command 610a and updates an entry in command tracker 602 accordingly. In addition, one or more entries in resource tracker 604 may be updated. Where command tracker 602 includes information related to commands in a retry state, resource tracker 604 maintains information related to each of the memory resources.

In the illustrated embodiment, resource tracker 604 includes six entries (identified in the column, resource 630), one for each memory resource: MSQ 310, WBQ 311, WMQ 312, WRQ 313, RDQ 314, and MCH 315. Each entry includes information related to one memory command waiting on the corresponding memory resource. Command ID 631 identifies the memory command 610 that is waiting for the respective resource. Various methods of identifying the corresponding memory command 610 are known and contemplated, such as, for example, an entry number for the memory command queue 601 entry, in which the memory command 610 is stored, a memory address for a location of the memory command 610 in memory command queue 601, or an index pointer value indicating an offset from starting or ending location in memory command queue 601. Priority 632 indicates the priority of the identified memory command 610 and may be copied from the respective priority 611 column in memory command queue 601. Required 633 indicates if the identified memory command 610 requires use of the respective memory resource. Ready 634 indicates if the respective memory resource is available or not.

Returning to the example, upon reading command 610a, control logic 303 determines that resources MSQ 310, WBQ 311, and WRQ 313 are needed to process the command. In addition to creating an entry in command tracker 602, control logic 303 determines if updates are need to the MSQ, WBQ, and WRQ entries in resource tracker 604. To determine if a given entry is to be updated, control logic 303 first determines if another command is currently included in the given entry. If not, then the given entry is updated with the details corresponding to command 610a, e.g., command ID is set to identify command 610a, priority 632 is set to '0' (matching the corresponding priority 611 value in memory command queue 601), required 633 is set to indicate that the respective memory resource is required by memory command 610a.

If another memory command is currently included in the given entry, then control logic 303 compares the corresponding priority 611 for command 610a (in this case '0'), and compares to the priority value in the given entry. If the priority of command 610a is higher (a value of '0' being the highest), then the given entry is updated with the details corresponding to command 610a. If the priority of command 610a is equal to the corresponding priority 632, then one of several "tie breakers" may be used to determine if the given entry is to be updated. In some embodiments, if the priority of command 610a matches the current priority 632, then the given entry may not be updated, leaving the current information in the given entry. In other embodiments, the given entry may always be updated with the information of the new command. In the present embodiment, control logic determines which command is older, the current identified command or command 610a. It is noted that in some systems, commands may be issued out of order for a variety of reasons, including a priority of a software process that includes the command, or to improve efficiency of the processor. In systems allowing out-of-order execution, a cache sub-system, such as, for example, cache sub-system 300, may receive a memory command corresponding to an older instruction after receiving a memory command corresponding to a newer instruction.

In the present example, entries in resource tracker 604 are updated for the MSQ, WBQ and WRQ in response to reading command 610a. It is noted that in the example of FIG. 6, the values for ready 634 are set to '1' for the MSQ and the WBQ, indicating that these two resources are available. The value of ready 634 for the WRQ, however, is set to '0' indicating that this resource is not currently available.

Control logic 303 next reads command 610b, determining that it also requires resource WRQ 313 which is unavailable. A corresponding entry is created in command tracker 602 which indicates that command 610b requires resources WRQ 313 as well as MCH 315. The entries for the WRQ and MCH in resource tracker 604 are reviewed to determine if either should be updated. The current values for WRQ correspond to command 610a with a priority 632 of '0'. The priority 611 of command 610b is '1', which is a lower priority than '0' in the present embodiment. Accordingly, the entry for WRQ remains unchanged. The MCH entry, on the other hand, may be empty or of a lower priority than command 610b. The MCH entry is updated to correspond to command 610b.

Control logic 303 reads command 610c, determines that the unavailable resource WRQ 313 is needed. An entry in command tracker 602 is created. Entries corresponding to the resources needed for command 610c (MSQ, WBQ, and WRQ) in resource tracker 604 are reviewed to determine if they should be updated. Since entries for all three resources identify command 610a, which is higher priority than command 610c ('0' versus '2'), each resource entry remains unchanged.

Memory commands 610d and 610e are read, in respective order, by control logic 303. These commands require use of RDQ 314 and WMQ 312, respectively. Since both of these resources are available, each command continues to be processed and no corresponding entries are created in command tracker 602. The respective ready values in resource tracker 604, however, may be set to a value indicating that each resource is unavailable while in use for processing commands 610d and 610e.

Control logic 303 reads memory command 610f next. Command 610f requires only memory resource MCH 315, which is available. Command 610b, however, also requires MCH 315, but is waiting for WRQ 626 to become available. In some embodiments, control logic 303 may let command 610f continue to process since the required resource (MCH 315) is available. In the present embodiment, however, control logic 303 creates an entry in command tracker 602 with the MCH 628 value set to indicate the requirement for the memory resource MCH 315 by command 610f. In addition, the MCH entry in resource tracker 604 is reviewed to determine if command 610f has a higher priority 611 than the currently identified command (610b). In the example, command 610b has a priority of '1' and command 610f has a priority of '3', lower than command 610b. Accordingly, no updates are made to the MCH entry in resource tracker 604.

If command 610f had a higher priority 611 than command 610b (e.g. '0'), then the MCH entry in resource tracker 604 would be updated with the information of command 610f. In this case, since MCH 315 is available and command 610f is not waiting on other resources, control logic 303 may allow command 610f to continue processing. In addition, if command 610f had an equal priority as command 610b, then a tie breaker process may be used as previously described. If command 610f "wins" the tie breaker, control logic 303 may again allow command 610f to continue processing with resource MCH 315.

When resource WRQ 313 becomes available, control logic 303 reads the WRQ entry in resource tracker 604 and determines that command 610a is the highest priority memory command waiting on WRQ 313. Control logic 303 then reads the command 610a entry in command tracker 602 to determine if other memory resources are needed for command 610*a*. If the indicated resources (in this example, MSQ 310 and WBQ 311) are also available, then control logic 303 allows command 610*a* to process. Otherwise, if at least one other needed resource is unavailable, WRQ 313 and the other indicated memory resources remain reserved for command 610*a* until either all required resources are available or a higher priority command is read that needs WRQ 313.

It is noted that FIG. 6 is merely an example. Although the six memory resources (blocks 310-315) in FIG. 3 are used as examples of memory resources, any logic, circuits, buffers, etc., that are used to fulfill memory commands may be used as memory resources.

Figure 7:
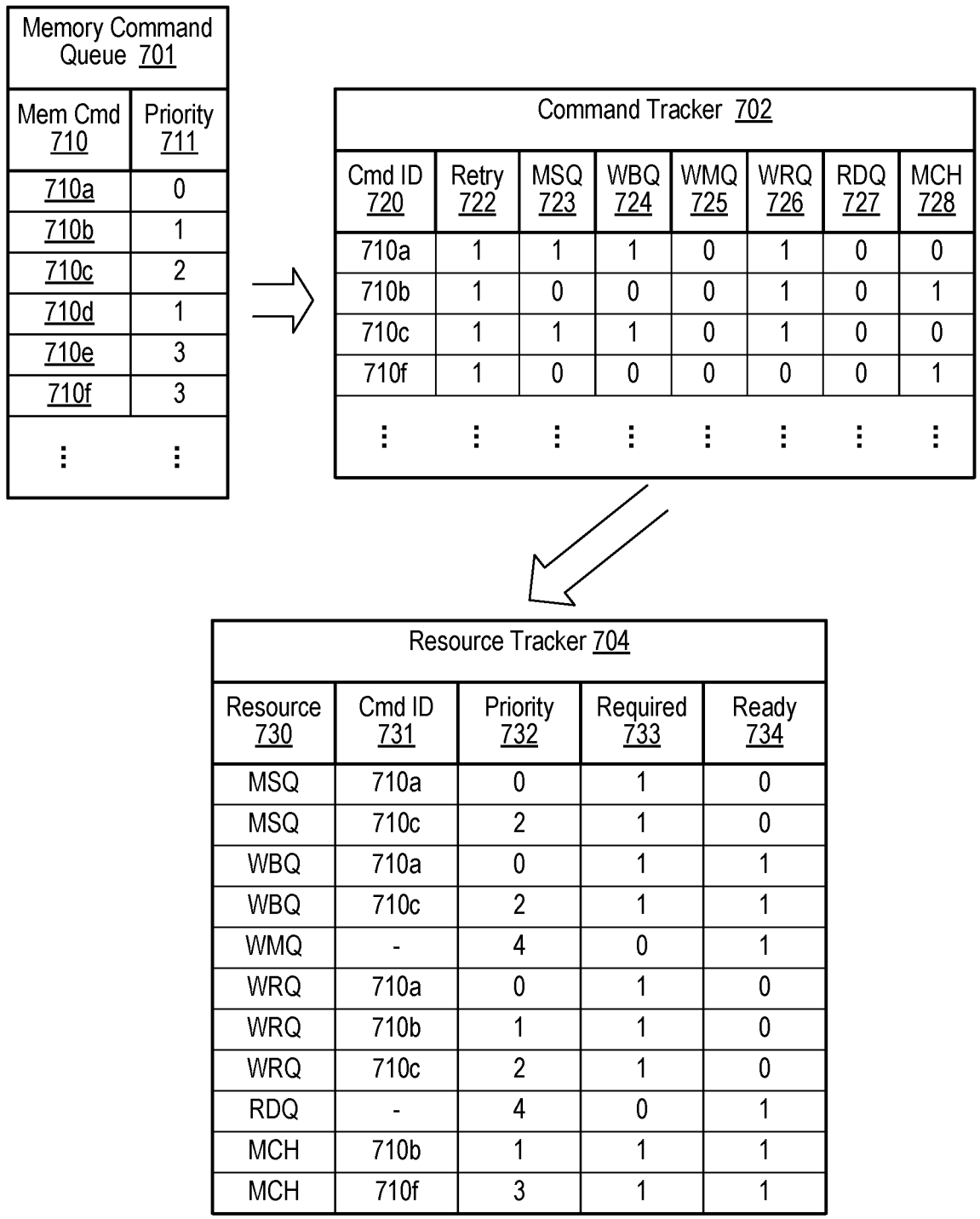
FIG. 7 illustrates a diagram of tables representing another embodiment of a memory queue, a command tracker, and a global resource table.

Moving to FIG. 7, a diagram of tables representing another embodiment of a memory queue, a command tracker, and a resource tracker is shown. In the illustrated embodiment, memory command queue 701 and command tracker 702 corresponds to memory command queue 601 and command tracker 602, respectively, and, therefore, their operation is as described above. In the illustrated embodiment, resource tracker 704 includes columns resource 730, command ID (Cmd ID) 731, priority 732, required 733, and ready 734, similar to columns described above for resource tracker 604 in FIG. 6. Whereas resource tracker 604 includes a single entry for each memory resource 310-315, resource tracker 704 may include multiple entries for each memory resource, one for each memory command priority level.

In the example of FIG. 6, the entries for MSQ, WBQ, and WRQ each identified only memory command 610*a* as a prioritized command waiting for each resource. Other commands waiting for these resources are not identified, only the command with the highest priority. In the present embodiment, resource tracker 704 allows control circuitry, such as, for example, control logic 303 in FIG. 3, to create multiple entries for each memory resource, thereby creating an entry to identify one memory command per priority level for each resource.

As an example, memory commands 710 correspond to memory commands 610 in FIG. 6. When command 710*a* is read by control logic 303, respective entries are created in resource tracker 704 for each required resource: MSQ, WBQ, and WRQ, similar to the example described in FIG. 6. When control logic 303 reads command 710*b*, in addition to creating an entry for resource MCH as described for FIG. 6, a second entry is created for WRQ to identify command 710*b* as another memory command waiting for resource WRQ. Similarly, when memory command 710*c* is read, control logic 303 creates new entries for memory resources MSQ, WBQ, and WRQ. After reading and processing commands 710*d* and 710*e*, control logic 303 reads command 710*f* and creates an entry for resource MCH.

When a given memory resource becomes available (such as, e.g., WRQ), control logic 303 determines the highest priority command identified for that resource (command 710*a*), and then refers to this command's entry in command tracker 702 to determine if all required resources for command 710*a* are available. If so, command 710 *a* may be processed. If at least one resource required for command 710*a* is unavailable (such as indicated by the ready value of '0' for memory resource MSQ), then the next highest priority memory command is determined (command 710*b*). Command 710*b* requires resource MCH in addition to WRQ. Since MCH is available (value of '1' for ready 734), command 710*b* may be processed.

While the embodiment of resource tracker 704 illustrated in FIG. 7 includes one entry per priority level, any suitable number of entries may be included for any suitable number of priority levels. For example, other embodiments of a resource tracker table may include two entries per priority level or may include one entry for every two priority levels. In some embodiments, a first entry may be reserved for a highest priority level and all other priority levels may share a second entry.

It is noted that the tables illustrated in FIG. 7 are merely an example embodiment. Variations are possible, such as, for example, a different number of columns in each table.

Figure 8:
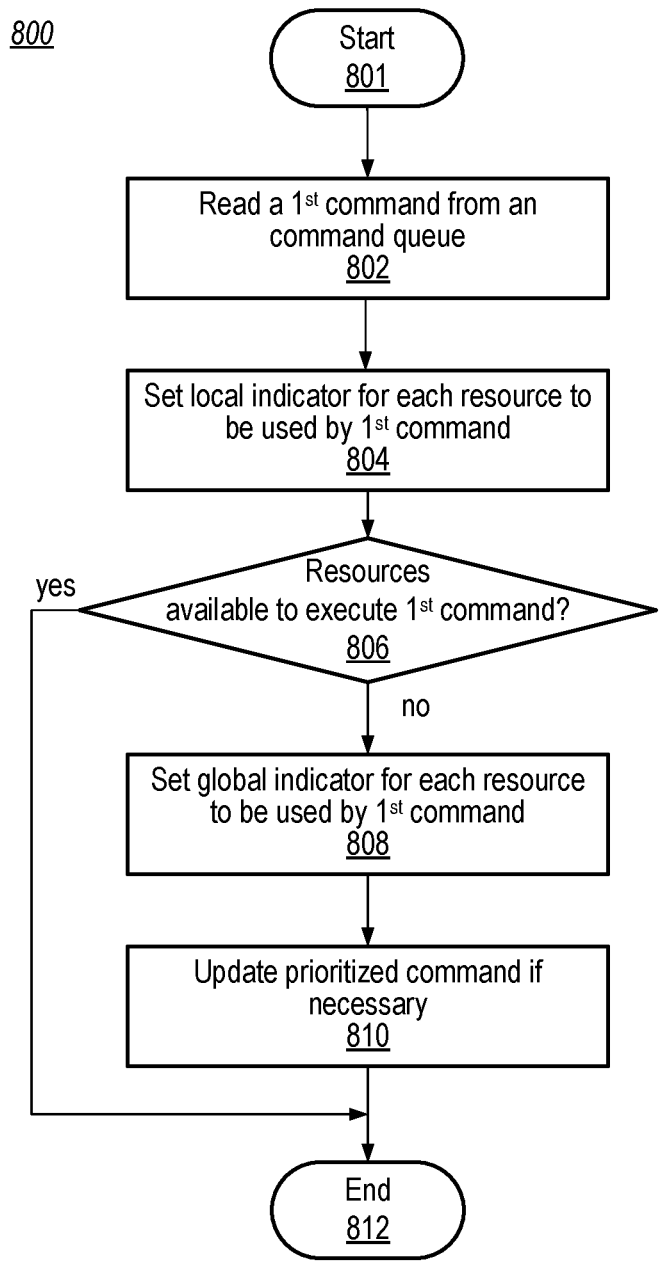
FIG. 8 illustrates a flow diagram of an embodiment of a method for processing an instruction in a command queue.

Turning now to FIG. 8, a flow diagram illustrating an embodiment of a method for processing an instruction in a command queue is shown. Method 800 may be applied to a memory controller, such as, for example, cache controller 301 in FIG. 3. Referring collectively to FIG. 3 and the flow diagram of FIG. 8, the method may begin in block 801.

In the illustrated embodiment, a first command is read from a command queue (block 802). For example, control circuitry, such as control logic 303, reads a command from a queue, such as command queue 305*a*. The first command may require use of one or more resources in cache controller 301 in order to be processed.

A local indicator is set for each resource required by the first command (block 804). Each local indicator may correspond to a single respective command read by control logic 303. A local indicator includes one or more data bits that are set to a predetermined value to indicate a corresponding resource is required by the single respective command, such as, for example, each value in columns 423 through 428 of table 402 in FIG. 4, may be referred to as a "local indicator." The local indicators, may, in various embodiments, be included as part of command queue 305*a* (as shown in FIG. 5) or may be included in a separate table (as shown by table 402 in FIG. 4).

Further operation of the method depends on a determination if the required resources are available for the first command (block 806). For each resource identified by the local indicators corresponding to the first instruction, a determination is made if that resource is currently available. To make the determination, control logic 303 may read one or more entries in a resource tracking table, such as resource tracker 306. If at least one of the required resources is unavailable, then the method moves to block 808 to set global indicators for each required resource. Otherwise, if all required resources are available, the method ends in block 812.

If at least one required resource is unavailable, a value in an entry in a global resource table is updated for each required resource (block 808). Resource tracker 604 in FIG. 6 illustrates an example of a "global resource table." Each entry in the global resource table may correspond to a single respective resource used by the commands in command queue 305*a*. Each entry includes one or more data bits that are set to a predetermined value to indicate one or more commands are waiting for the corresponding resource. Global resource table entries may also include information such as an availability status of the corresponding resource and a priority of the one or more commands waiting for the resource. An entry for each resource required by the first command is updated to indicate that at least one command is waiting for the corresponding resource.

If applicable, the respective entry for each required resource is updated to identify the first command (block 810). For each resource required by the first command, the respective entry in the global resource table may include a value for identifying a highest priority command waiting for the corresponding resource. In some embodiments, if the first command has a higher priority than a currently identified command, then the respective entry is updated to identify the first command rather than the currently identified command. The respective entry may also include an indication of the priority of the identified command which is updated with the priority of the first command. Further details regarding updating an entry in a global resource table are disclosed below. The method ends in block 812.

It is noted that the method illustrated in FIG. 8 is an example for demonstrating the disclosed concepts. In other embodiments, operations may be performed in a different sequence. Additional operations may also be included.

Figure 9:
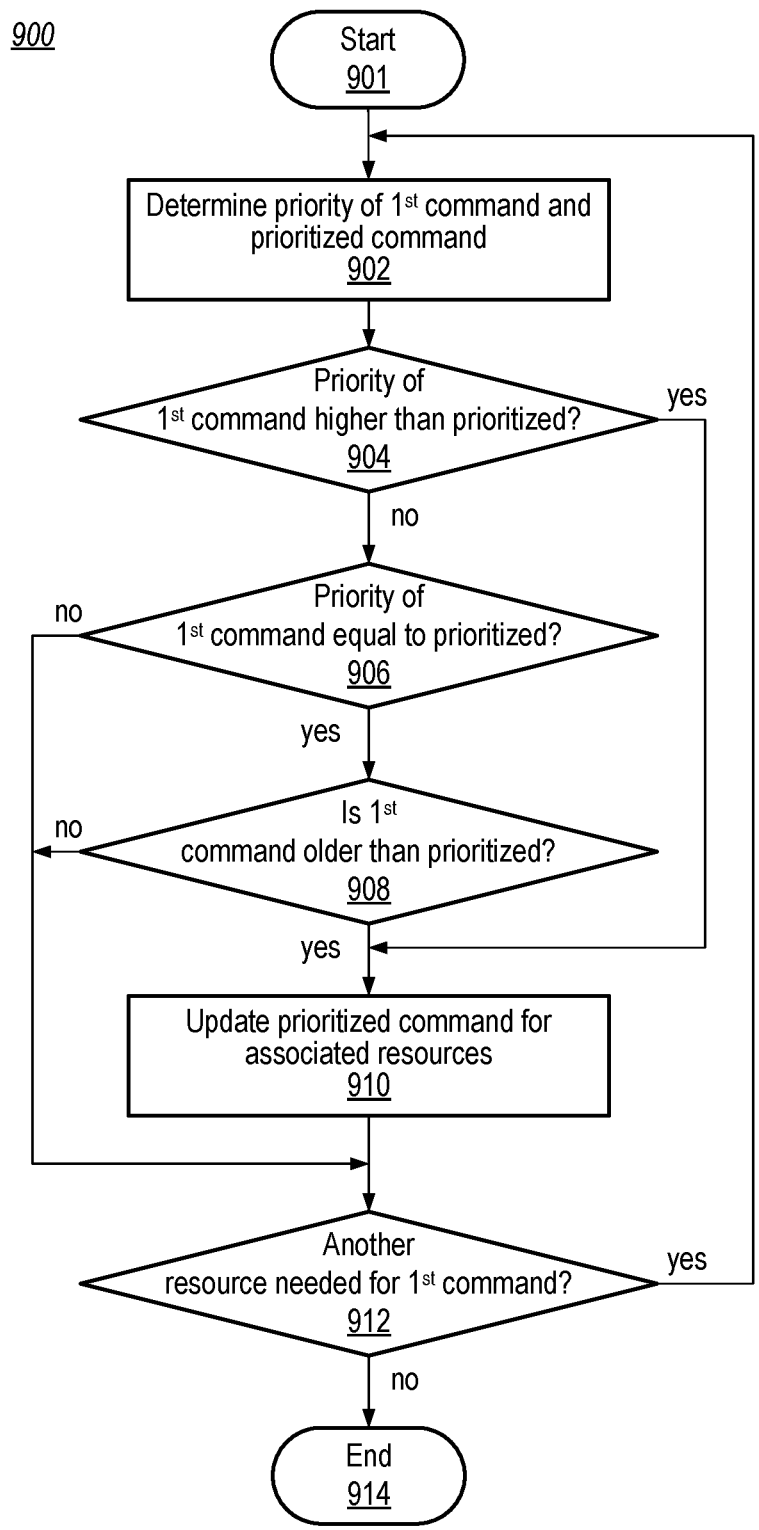
FIG. 9 shows a flow diagram illustrating an embodiment of a method for updating a global resource table.

Moving now to FIG. 9, a flow diagram illustrating an embodiment of a method for updating a global resource table is shown. Method 900 may correspond to block 810 of method 800 in FIG. 8. In some embodiments, method 900 may be applied to a memory controller, such as, for example, cache controller 301 in FIG. 3. Referring collectively to FIG. 3 and the flow diagram of FIG. 9, the method may begin in block 901 with a first command having been read and determined to require at least one resource that is unavailable.

In the illustrated embodiment, a priority of the first command and a priority of a currently prioritized command are determined (block 902). The priority of the first command may be determined by reading an entry for the first command from a command queue such as, for example, command queue 305a. In some instances, a priority level may not be assigned to the first command, in which case, control circuitry, such as, e.g., control logic 303, may determine and assign a priority to the first command. For a first required resource, the priority of the currently prioritized command is determined from an entry in a global resource table, such as, e.g., resource tracker 306. In the event that no command is currently prioritized in an entry for the first required resource, then a minimal value is assigned, such that any priority value of the first command may be determined to be higher than the minimal value.

Further operations of the method depend on the priority of the first command and the priority of the currently prioritized command (block 904). The priority of the first command is compared to the priority of the currently prioritized command. If the priority of the first command is lower than that of the currently prioritized command, the method moves to block 908 to determine of the two priorities are equal. Otherwise, the first command is selected to replace the currently prioritized command and the method moves to block 912 to update the respective entry for the first required resource.

Further operations of the method again depend upon the priority of the first command and the priority of the currently prioritized command (block 906). If the priority of the first command is not determined to be higher than the priority of the currently prioritized command, then the two priorities are compared to determine if the priorities are equal. If the priority of the first command is equal to the priority of the currently prioritized command, then the method moves to block 908 to determine which of the two commands is older. Otherwise, the method moves to block 912 to determine if another resource is required for the first command.

Additional operations of the method depend upon an age of the first command and an age of the currently prioritized command (block 908). If the priorities of the first command and the currently prioritized command are determined to be equal, then an age of each command may be used as a tie breaker. As used herein, an "age" of a command refers to a time at which an instruction related to the command is fetched by a processor, such as, for example, processor 101 in FIG. 1. In some computing systems, instructions fetched by the processor may be issued out-of-order, allowing a "younger" instruction to begin execution before an "older" instruction that was fetched before the younger instruction. Out-of-order execution may allow a processor to prioritize a given software process higher than other processes. Using a smartphone as an example, a process related to receiving a phone call may be prioritized above a process for playback of a media file. If the first command is older than the currently prioritized command, then the first command is selected to replace the currently prioritized command and the method moves to block 910 to update the respective entry for the first required resource. Otherwise, the method moves to block 912 to determine if another resource is required for the first command.

If the first command is selected to replace the currently prioritized command, then the respective entry in the global resource table is updated with information corresponding to the first command (block 910). Updated values in the respective entry in global resource table may include an identification value for identifying the first command in command queue 305a and/or command tracker 305b, as well as updating the priority value to correspond to priority of the first command. In addition, a value indicating that the respective resource is required by the first instruction may be updated.

Additional operations of the method may depend on a determination if additional resources are required for the first command (block 912). Operations of method 900 may be repeated for each resource required by the first instruction to determine if other resources require updating. If another resource is required by the first instruction, then the method moves to block 902 to determine a priority of a command currently prioritized this resource. Otherwise, if no further resources are required by the first command, then the method ends in block 914.

It is noted that the method illustrated in FIG. 9 is merely an example for demonstration. In other embodiments, additional operations may be included. In addition, operations may be performed in a different sequence in various embodiments.

Figure 10:
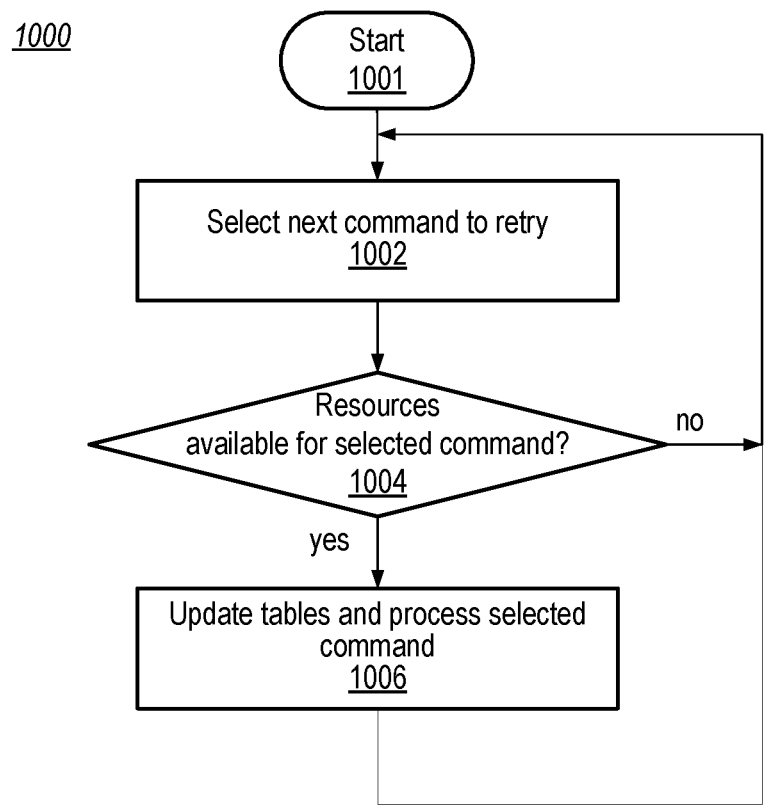
FIG. 10 illustrates a flow diagram of an embodiment of a method for selecting an instruction for retry processing.

Turning to FIG. 10, a flow diagram for an embodiment of a method to select an instruction for retry processing is illustrated. Method 1000 may be performed by a memory controller, such as, for example, cache controller 301 in FIG. 3. Referring collectively to FIG. 3 and the flow diagram of FIG. 10, the method may begin in block 1001 with at least one command in a retry state and an entry corresponding to the at least one command in a command tracking table, such as, for example, command tracker 305b.

In the present embodiment, a command is selected for retry processing (block 1002). An entry in command tracker 305b is read to identify a command in the retry state and resources required by the identified command. In some embodiments, a priority of the selected command may also be read from the entry. The command may be selected in various ways, including, but not limited to, selecting the command with a next highest priority from a previously selected command, selecting a command that has spent the most amount of time in the retry state, or selecting a command dependent on an order the command's entry in the command tracker 305b.

Further operations of the method may depend on a determination if resources required by the selected command are available (block 1004). Control circuitry, such as, for example, control logic 303, determines if resources identified by the entry corresponding to the selected command are available. If the resources are determined to be available, then the method moves to block 1006 to process the command. Otherwise, the method returns to block 1002 to identify a next command to retry.

If the resources are available, then the selected command is processed (block 1006). The identified resources are assigned to the selected command and the command is executed. In addition, tables used for tracking commands in the retry state and for tracking status of the corresponding resources, e.g., command tracker 305*b* and resource tracker 306, are updated to reflect that the selected command has been processed and is no longer in a retry state. Entries in resource tracker 306 corresponding to the resources assigned to the selected command may, in some embodiments, be updated to remove references to the selected command if such references are included in the entries. If a reference to the selected command is removed from a given resource's entry, control logic 303 may determine if another command in the retry state is waiting for the given resource and update the reference to identify a next command waiting for the resource. Control logic 303 may also update the selected command's entry in command tracker 305*b* to indicate that the command is no longer in the retry state. The selected command's entry may now be available for a next command to be placed into the retry state.

It is noted that the method illustrated in FIG. 10 is merely an example. In other embodiments, additional operations may be included, and operations may be performed in a different sequence or in parallel.

Figure 11:
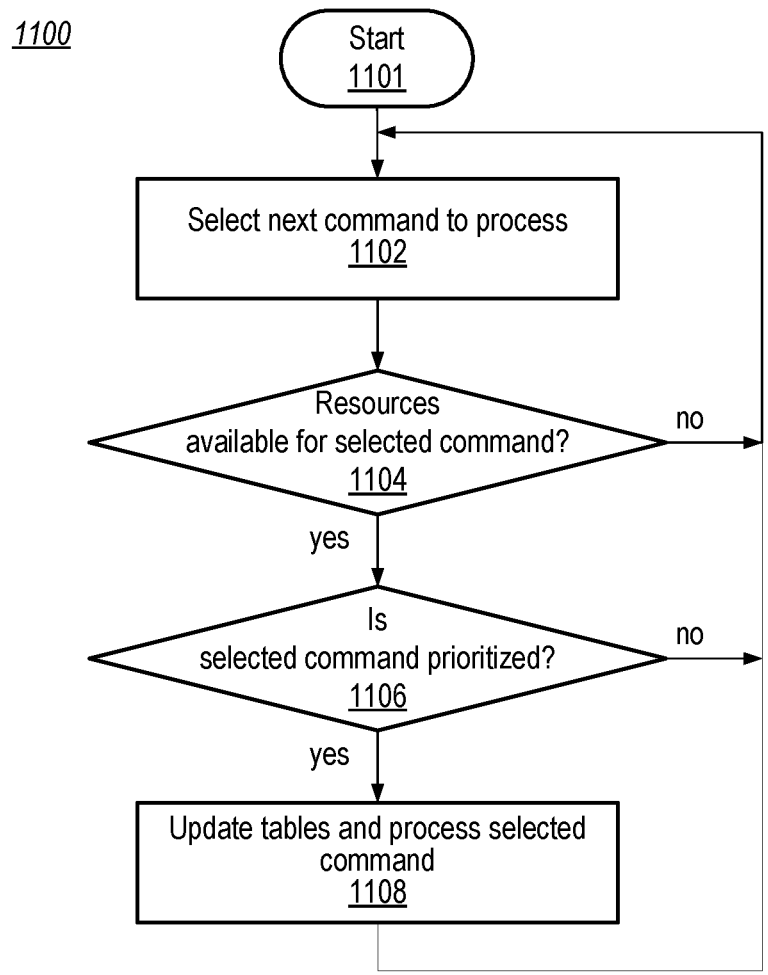
FIG. 11 shows a flow diagram illustrating another embodiment of a method for selecting an instruction for retry processing.

Moving to FIG. 11, a flow diagram illustrates another embodiment of a method to select an instruction for retry processing is shown. Similar to method 1000 of FIG. 10, method 1100 may be performed by a memory controller, such as, for example, cache controller 301 in FIG. 3. Referring collectively to FIG. 3 and the flow diagram of FIG. 11, the method may begin in block 1101 with at least one command in a retry state and an entry corresponding to the at least one command in a command tracking table, such as, for example, command tracker 305*b*.

Similar to operation 1002 of method 1000, a command is selected for retry processing (block 1102). Control circuitry, such as, e.g., control logic 303, reads an entry in command tracker 305*b* and a command in the retry state is identified. Control logic 303 determines which resources are required by the identified command. A priority of the selected command may also be read from the entry. The command may be selected in various ways, as described for operation 1002 of method 1000.

Additional operations of the method may depend on an availability of resources required by the selected command (block 1104). Control logic 303 determines if resources indicated by the entry corresponding to the selected command are available. If the resources are determined to be available, then the method moves to block 1106 to determine if the selected command is prioritized. Otherwise, the method returns to block 1102 to identify a next command to retry.

Further operations of the method may depend on a determination if the selected command is prioritized (block 1106). Control logic 303 reads entries in resource tracker 306 corresponding to each of the required resources and determines if the selected command corresponds to the currently prioritized command for each of the entries. If control logic 303 determines that the selected command is the currently prioritized command for each of the required resources, then the method moves to block 1108 to process the selected command. Otherwise, if the selected command does not correspond to the prioritized command for at least one required resource, then the method returns to block 1102 to identify a next command to retry.

If the selected command is prioritized for each required resource, then the selected command is processed (block 1108). The identified resources are assigned to the selected command and the command is executed. In addition, tables used for tracking commands in the retry state and the corresponding resources, e.g., command tracker 305*b* and resource tracker 306, are updated to reflect that the selected command has been processed and is no longer in a retry state. In some embodiments, entries in resource tracker 306 corresponding to the resources assigned to the selected command may be updated to remove references to the selected command. If a reference to the selected command is removed from a given resource's entry, control logic 303 may determine if another command in the retry state is waiting for the given resource and update the reference to identify a next prioritized command. Control logic 303 may also update the selected command's entry in command tracker 305*b* to indicate that the command is no longer in the retry state. The selected command's entry may now be available for a next command to be placed into the retry state.

It is noted that the method illustrated in FIG. 11 is one example use to demonstrate concepts disclosed herein. In other embodiments, additional operations may be included, and operations may be performed in a different sequence or in parallel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of memory resources, each memory resource configured to store one or more types of memory commands to be processed;
   a memory; and
   a control circuit configured to:
   maintain, in the memory, a command tracker table that includes a plurality of entries, each entry corresponding to a respective memory command;
   receive a particular memory command of a particular type;
   store a value identifying the particular memory command in a first entry of the command tracker table;

based on the particular type, set an indication in the first entry identifying each memory resource of the plurality of memory resources to be used by the particular memory command; and execute the particular memory command in response to a determination that all memory resources identified in the first entry are available.

2. The apparatus of claim 1, wherein the control circuit is further configured to:

receive a subsequent memory command of a different type; and store a value identifying the subsequent memory command in a second entry of the command tracker table.

3. The apparatus of claim 2, wherein the particular memory command and the subsequent memory command have respective, different priorities, and wherein the control circuit is further configured to store the value identifying the subsequent memory command in response to a determination that the second entry corresponds to a priority of the subsequent memory command and that the second entry is available.

4. The apparatus of claim 1, wherein the command tracker table includes one entry corresponding to each of a set of priorities.

5. The apparatus of claim 4, wherein the particular memory command and a subsequently received memory command have a same priority, and wherein the control circuit is further configured to exclude the subsequently received memory command from the command tracker table in response to a determination that the first entry corresponds to a priority of the subsequently received memory command and that the first entry is in use by the particular memory command.

6. The apparatus of claim 1, wherein the memory further includes a memory command queue that includes a plurality of entries for storing a plurality of memory commands and wherein the command tracker table includes a number of entries equal to a number of entries in the memory command queue.

7. The apparatus of claim 1, wherein the memory further includes a resource tracking table that includes at least one entry corresponding to each of the plurality of memory resources, and wherein the control circuit is further configured to, in response to a determination that at least one memory resource identified in the first entry is not available, set a value identifying the particular memory command in the resource tracking table in a respective entry corresponding to each of the memory resources identified in the first entry.

8. A method, comprising:

receiving, by a cache controller circuit, a particular memory command of a particular type;

storing, by the cache controller circuit, a value identifying the particular memory command in a first entry of a command tracker table;

based on the particular type, setting, by the cache controller circuit, an indication in the first entry identifying each memory resource of a plurality of resources to be used by the particular memory command; and executing, by the cache controller circuit, the particular memory command in response to determining that all memory resources identified in the first entry are available.

9. The method of claim 8, further comprising:

receiving a subsequent memory command of a different type; and storing a value identifying the subsequent memory command in a second entry of the command tracker table.

10. The method of claim 9, further comprising storing the value identifying the subsequent memory command in response to determining that the second entry corresponds to a priority of the subsequent memory command and that the second entry is available, wherein the particular memory command and the subsequent memory command have respective, different priorities.

11. The method of claim 10, further comprising, in response to determining that a previously unavailable resource is now available, determining if a memory command in the command tracker table is waiting for the now available resource, wherein the determining includes reviewing memory commands in the command tracker table based on respective priorities of the memory commands.

12. The method of claim 8, further comprising excluding a subsequently received memory command from the command tracker table in response to determining that the first entry corresponds to a priority of the subsequently received memory command and that the first entry is in use by the particular memory command, wherein the particular memory command and the subsequently received memory command have a same priority.

13. The method of claim 8, further comprising, in response to a determination that at least one memory resource identified in the first entry is not available, setting a value indicating that the particular memory command is waiting for the at least one identified memory resource to become available.

14. The method of claim 8, further comprising, setting a value identifying the particular memory command in a resource tracking table in respective entries corresponding to each of the memory resources identified in the first entry.

15. An apparatus, comprising:

a plurality of memory resources, each memory resource configured to store one or more types of memory commands to be processed;

a memory; and a control circuit configured to:

maintain a memory command queue that includes a plurality of entries, each entry corresponding to a respective memory command;

retrieve, from a first entry in the memory command queue, a particular memory command of a particular type;

based on the particular type, set an indication in the first entry identifying each memory resource of the plurality of memory resources to be used by the particular memory command; and execute the particular memory command in response to a determination that all memory resources identified in the first entry are available.

16. The apparatus of claim 15, wherein the control circuit is further configured to:

retrieve, from a second entry in the memory command queue, a subsequent memory command of a different type;

based on the different type, set an indication in the second entry identifying each memory resource of the plurality of memory resources to be used by the subsequent memory command; and in response to a determination that at least one memory resources identified in the second entry is not available, set a retry indication in the second entry indicating that the subsequent memory command is waiting for the at least one identified memory resource to become available.

17. The apparatus of claim 16, wherein the memory further includes a resource tracking table that includes at least one entry corresponding to each of the plurality of memory resources, and wherein the control circuit is further configured to set a value identifying the subsequent memory command in the resource tracking table in a respective entry corresponding to each of the memory resources identified in the second entry.

18. The apparatus of claim 16, wherein the control circuit is further configured to store, in the second entry, a value indicating a priority for the subsequent memory command.

19. The apparatus of claim 18, wherein the control circuit is further configured to execute the subsequent memory command in response to a determination that the memory resources identified in the second entry are available and that the indicated priority in the second entry is greater than indicated priorities in other entries identifying available memory resources.

20. The apparatus of claim 15, wherein the control circuit is further configured to:
   in response to a determination that a previously unavailable resource is now available, review memory commands in the memory command queue with a respective retry indication set; and
   determine if a reviewed memory command is waiting for the now available resource.

* * * * *